(12) United States Patent
Wakou et al.

(10) Patent No.: US 9,163,603 B2
(45) Date of Patent: Oct. 20, 2015

(54) CONTROL SYSTEM FOR INTERNAL COMBUSTION ENGINE

(75) Inventors: Shinichirou Wakou, Saitama-ken (JP); Yoshihisa Tsuchiya, Saitama-ken (JP); Masanobu Eguchi, Saitama-ken (JP); Shinji Yasuno, Saitama-ken (JP); Kanao Kogure, Saitama-ken (JP); Nobuyuki Akahoshi, Saitama-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 584 days.

(21) Appl. No.: 13/541,067

(22) Filed: Jul. 3, 2012

(65) Prior Publication Data

US 2013/0030679 A1 Jan. 31, 2013

(30) Foreign Application Priority Data

Jul. 27, 2011 (JP) ................. 2011-163869

(51) Int. Cl.
| | | |
|---|---|---|
| *G06F 19/00* | (2011.01) | |
| *G06G 7/70* | (2006.01) | |
| *F02N 11/08* | (2006.01) | |
| *F02D 29/02* | (2006.01) | |
| *B60H 1/00* | (2006.01) | |
| *B60H 1/32* | (2006.01) | |

(52) U.S. Cl.
CPC .......... *F02N 11/084* (2013.01); *B60H 1/00778* (2013.01); *B60H 1/322* (2013.01); *F02D 29/02* (2013.01); *B60H 2001/3266* (2013.01); *B60H 2001/3282* (2013.01); *F02N 2200/0806* (2013.01); *F02N 2200/0811* (2013.01); *F02N 2200/122* (2013.01); *Y02T 10/48* (2013.01)

(58) Field of Classification Search
CPC ... Y02T 10/48; F02N 11/084; F02N 11/0818; F02N 2200/0806; F02N 2200/0804; F02N 2200/023; F02N 11/0855; F25B 49/022; F25B 5/02; B60H 1/00792; B60H 1/00778; B60H 2001/3282; F24F 11/006
USPC .......... 123/179.4, 179.3, 179.1; 701/112, 113
See application file for complete search history.

(56) References Cited

U.S. PATENT DOCUMENTS

| | | | |
|---|---|---|---|
| 7,562,535 B2* | 7/2009 | Deiml et al. ............ | 62/115 |
| 8,347,642 B2* | 1/2013 | Akahoshi et al. ....... | 62/133 |
| 2004/0144107 A1 | 7/2004 | Breton et al. | |

(Continued)

FOREIGN PATENT DOCUMENTS

| | | |
|---|---|---|
| DE | 10 2008 050 854 A1 | 4/2010 |
| EP | 2 098 392 A1 | 9/2009 |
| EP | 2 169 212 A2 | 3/2010 |
| JP | 2009-138708 | 6/2009 |
| JP | 4475437 B2 | 3/2010 |
| WO | 95/01595 A1 | 1/1995 |

*Primary Examiner* — Mahmoud Gimie
*Assistant Examiner* — Sizo Vilakazi
(74) *Attorney, Agent, or Firm* — Mori & Ward, LLP

(57) ABSTRACT

A control system for an internal combustion engine, which is capable of properly determining timing for restarting the engine in a stopped state when idle stop control of the engine is executed during a heating operation of an air conditioner, thereby making it possible to ensure marketability and fuel economy performance in a well-balanced manner. The control system executes the idle stop control of the engine during the heating operation of the air conditioner. The control system includes an ECU. The ECU sets a lower limit blowout temperature, calculates an estimated blowout temperature, and controls the engine such that the engine is restarted when the estimated blowout temperature has become not higher than the lower limit blowout temperature.

4 Claims, 8 Drawing Sheets

(56) References Cited

U.S. PATENT DOCUMENTS

| | | | |
|---|---|---|---|
| 2004/0149246 A1* | 8/2004 | Itoh et al. | 123/179.4 |
| 2004/0211381 A1* | 10/2004 | Ogawa et al. | 123/179.4 |
| 2007/0209612 A1* | 9/2007 | Kojima | 123/41.49 |
| 2009/0198438 A1* | 8/2009 | Jinno | 701/110 |
| 2010/0174460 A1* | 7/2010 | Gibson et al. | 701/54 |
| 2012/0283936 A1* | 11/2012 | Hashemi et al. | 701/113 |

* cited by examiner

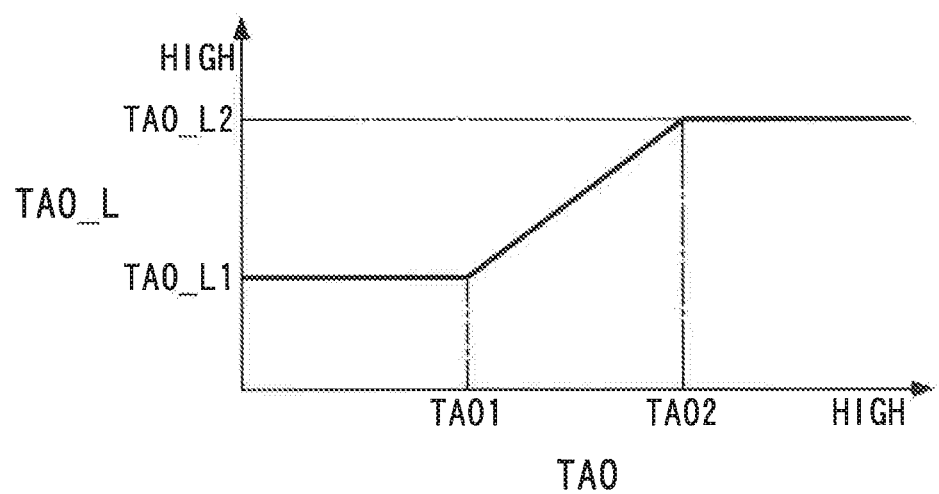

CONTROL SYSTEM FOR INTERNAL COMBUSTION ENGINE

BACKGROUND OF THE INVENTION

1. Field of the Invention

The present invention relates to a control system for an internal combustion engine installed on a vehicle, and more particularly to a control system for an internal combustion engine, for executing idle stop control for restarting the engine after temporarily stopping the engine during stoppage of the vehicle.

2. Description of the Related Art

Conventionally, the present applicant has already proposed a control system disclosed in Japanese Patent Publication No. 4475437 as a control system for an internal combustion engine. This engine is installed on a hybrid vehicle as a motive power source. The vehicle is equipped with a motor generator as a motive power source, an air conditioner, and so forth. Further, the control system executes operation control of the air conditioner, idle stop control of the engine, and so forth, and is equipped with various sensors, such as a humidity sensor, and various switches, such as an air conditioner switch.

In this control system, the idle stop control is executed such that while the air conditioner is performing a cooling operation during stoppage of the vehicle, the engine is stopped when predetermined stop conditions are satisfied, and the engine is restarted when a time period elapsed after the stoppage of the engine has reached an engine stoppage time Ts. This engine stoppage time Ts is calculated by a method shown in FIGS. 2 and 3 in Japanese Patent. Publication No. 4475437. More specifically, a temperature rise coefficient Kt is calculated according to the amount of air blown out from the air conditioner and a state of settings of the air conditioner switch for inside air circulation or outside air introduction, and an allowable upper limit temperature Eu of an evaporator is calculated by searching a map according to a target blowout temperature.

Then, a compartment temperature rise-permitting time Tu is calculated as the reciprocal of a value obtained by multiplying a difference between the allowable upper limit temperature Eu and a temperature Es of the evaporator during stoppage of the engine by the temperature rise coefficient Kt. Then, a fogging occurrence estimated time Tf is calculated based on a humidity or the like within a vehicle compartment during stoppage of the engine. When Tf<Tu holds, the engine stoppage time Ts is set to the compartment temperature rise-permitting time Tu, whereas when Tf≥Tu holds, the engine stoppage time Ts is set to the fogging occurrence estimated time Tf.

In the case of the control system disclosed in Japanese Patent Publication No. 4475437, a control method is employed in which the idle stop control is executed during the cooling operation of the air conditioner, and hence there is a problem that the control method cannot be applied to idle stop control during a heating operation of the air conditioner. For example, although in the control system disclosed in Japanese Patent Publication No. 4475437, the engine stoppage time Ts is calculated using e.g. the temperature of the evaporator, the evaporator is used during the cooling and dehumidifying operations of the air conditioner, but during the heating operation of the air conditioner, the evaporator is held at rest. without being used. Therefore, during the heating operation of the air conditioner, when the engine stoppage time Ts is calculated using the temperature of the evaporator as a parameter as in the control system disclosed in Japanese Patent Publication No. 4475437, there is a fear that the calculated engine stoppage time Ts becomes improper. For example, when a too long time period is obtained as a result of the calculation, the temperature of the vehicle compartment is lowered to an unpleasant temperature before the restart of the engine after stoppage thereof. On the other hand, when a too short time period is obtained as a result of the calculation, the time period before the restart of the engine after stoppage thereof is made shorter than required, which degrades fuel economy.

SUMMARY OF THE INVENTION

It is an object of the present invention to provide a control system for an internal combustion engine, which is capable of properly determining timing for restarting the engine at rest when idle stop control of the engine is executed during a heating operation of an air conditioner, thereby making it possible to ensure marketability and fuel economy performance in a well-balanced manner.

To attain the above object, the present invention provides a control system for an internal combustion engine that is installed on a vehicle as a motive power source and is connected, as a motive power source, to as heat supply device that supplies heat to an air conditioner of the vehicle, the control system executing idle stop control for temporarily stopping the engine during stoppage of the vehicle and restarting the engine from the temporarily stopped state, comprising lower limit blowout temperature-setting means for setting a lower limit value of a blowout temperature that is a temperature of air blown out from the air conditioner into a compartment of the vehicle, as a lower limit blowout temperature, estimated blowout temperature-calculating means for calculating an estimated value of the blowout temperature as an estimated blowout temperature, and control means for causing the engine to be restarted when the estimated blowout temperature calculated when the engine is in the temporarily stopped state has become not higher than the lower limit blowout temperature.

With the configuration of this control system, the lower limit value of the blowout temperature that is a temperature of air blown out from the air conditioner into the compartment of the vehicle is set as the lower limit blowout temperature, and the estimated value of the blowout temperature is calculated as the estimated blowout temperature. This engine is connected, as a motive power source, to the heat supply device for supplying heat to the air conditioner of the vehicle, and hence when the engine is temporarily stopped during stoppage of the vehicle, the heat supply device as well is stopped, so that the supply of heat to the air conditioner is stopped. This lowers the blowout temperature. On the other hand, according to this control system for the engine, the engine is controlled such that it is restarted when the estimated blowout temperature, which is calculated when the engine is in the temporarily stopped state, has become not higher than the lower limit blowout temperature, so that even when the blowout temperature is lowered along with stoppage of the engine during the heating operation, it is possible to restart the engine and raise the blowout temperature in timing in which the estimated blowout temperature has become not higher than the lower limit blowout temperature. Therefore, by setting the lower limit blowout temperature e.g. to a lowest temperature that does not discomfort an occupant in the vehicle compartment during the heating operation of the air conditioner, it is possible to determine restart timing from the stopped state of the engine such that degradation of fuel economy is minimized while holding the blowout temperature within a pleasant temperature range. This makes it possible to ensure marketability and fuel economy performance in a well-balanced manner.

Preferably, the air conditioner includes an electric fan, and the control system further comprises air conditioner suction temperature-detecting means for detecting a temperature of air sucked into the air conditioner as an air conditioner suction temperature, and power parameter-detecting means for detecting a power parameter indicative of electric power supplied to the electric fan, the estimated blowout temperature-calculating means comprising stop-time blowout temperature-calculating means for calculating the blowout, temperature in timing in which the engine is temporarily stopped, as a stop-time blowout temperature, temperature drop amount-calculating means for calculating a temperature drop amount of the air blown out from the air conditioner after the timing in which the engine is temporarily stopped, using the air conditioner suction temperature detected when the engine is in the temporarily stopped state, and the power parameter detected when the engine is in the temporarily stopped state, and subtraction means for calculating the estimated blowout temperature by subtracting the calculated temperature drop amount from the calculated stop-time blowout temperature.

With the configuration of the preferred embodiment, the temperature of air sucked into the air conditioner is detected as the air conditioner suction temperature, and the power parameter indicative of electric power supplied to the electric fan is detected. Further, the blowout temperature in timing in which the engine is temporarily stopped is calculated as the stop-time blowout temperature, and the temperature drop amount of the air blown out from the air conditioner after the timing in which the engine is temporarily stopped is calculated using the air conditioner suction temperature detected when the engine is in the temporarily stopped state, and the power parameter detected when the engine is in the temporarily stopped state. In this case, both of the air conditioner suction temperature and the power parameter have a very high correlation with the drop of the temperature of air blown out from the air conditioner after timing in which the engine is temporarily stopped, so that by using such two values, it is possible to calculate the temperature drop amount after the timing in which the engine is temporarily stopped with high calculation accuracy, whereby it is possible to enhance the calculation accuracy of the estimated blowout temperature. As a consequence, it is possible to more properly determine the restart timing from the stopped state of the engine, thereby making it possible to ensure marketability and fuel economy performance in a better-balanced manner (Note that throughout the specification, the term "detect" used in the following phrases "detecting the air conditioner suction. temperature" and "detecting the power parameter" is intended to mean not only directly detecting the values of the temperature and the parameter e.g. by sensors but also calculating or estimating the values based. on other parameters).

Preferably, the control system further comprises operating environment parameter-detecting means for detecting an operating environment parameter indicative of an operating environment of the air conditioner, and the lower limit blowout temperature-setting means sets the lower limit blowout temperature based on the operating environment parameter detected in the timing in which the engine is temporarily stopped.

With the configuration of the preferred embodiment, the lower limit blowout temperature is set based on the operating environment parameter detected in the timing in which the engine is temporarily stopped. In this case, since the operating environment parameter represents the operating environment of the air conditioner, the detection value of the operating environment parameter, detected in the timing in which the engine is temporarily stopped, properly represents the operating environment of the air conditioner in the timing in which the engine is temporarily stopped. Therefore, by setting the lower limit blowout temperature based on such an operating environment parameter, it is possible to properly set the lower limit blowout temperature while causing the operating environment of the air conditioner in the timing in which the engine is temporarily stopped to be reflected thereon, thereby making it possible to more properly determine the restart timing from the stopped state of the engine. As a consequence, it is possible to ensure marketability and fuel economy performance in a better-balanced manner (Note that throughout the specification, the term "detect" used in the phrase "detecting the operating environment parameter" is intended to mean not only directly detecting the operating environment parameter e.g. by a sensor but also calculating or estimating the value of the parameter based on another parameter).

The above and other objects, features, and advantages of the present invention will become more apparent from the following detailed description taken in conjunction with the accompanying drawings.

BRIEF DESCRIPTION OF THE DRAWINGS

FIG. 7 is a diagram showing an example of a map for use in calculating a lower limit blowout temperature TAO_L;

FIG. 8 is a diagram showing an example of a map for use in calculating a temperature drop amount α.

DETAILED DESCRIPTION OF PREFERRED EMBODIMENTS

Figure 1:
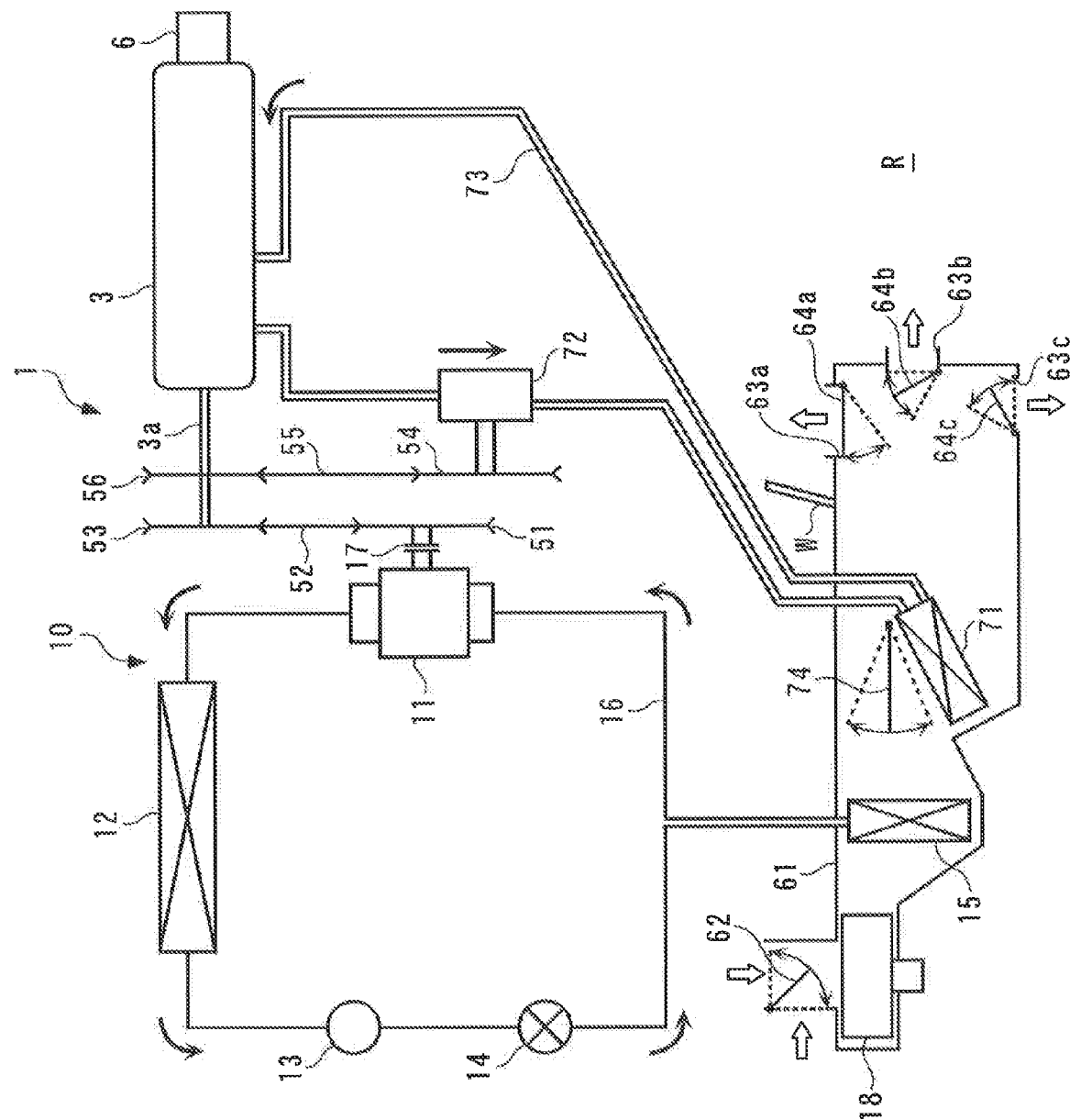
FIG. 1 is a schematic diagram of part of a control system according to an embodiment of the present invention and an internal combustion engine to which the control system is applied.

Hereafter, a control system for an internal combustion engine according to an embodiment of the invention will be described with reference to drawings. As will be described hereinafter, the control system 1 according to the present embodiment carries out various control processes for controlling the internal combustion engine 3, shown in FIG. 1, and a process for controlling the operation of an air conditioner 10, appearing in FIG. 1, and includes an ECU 2 (see FIG. 2).

Figure 2:
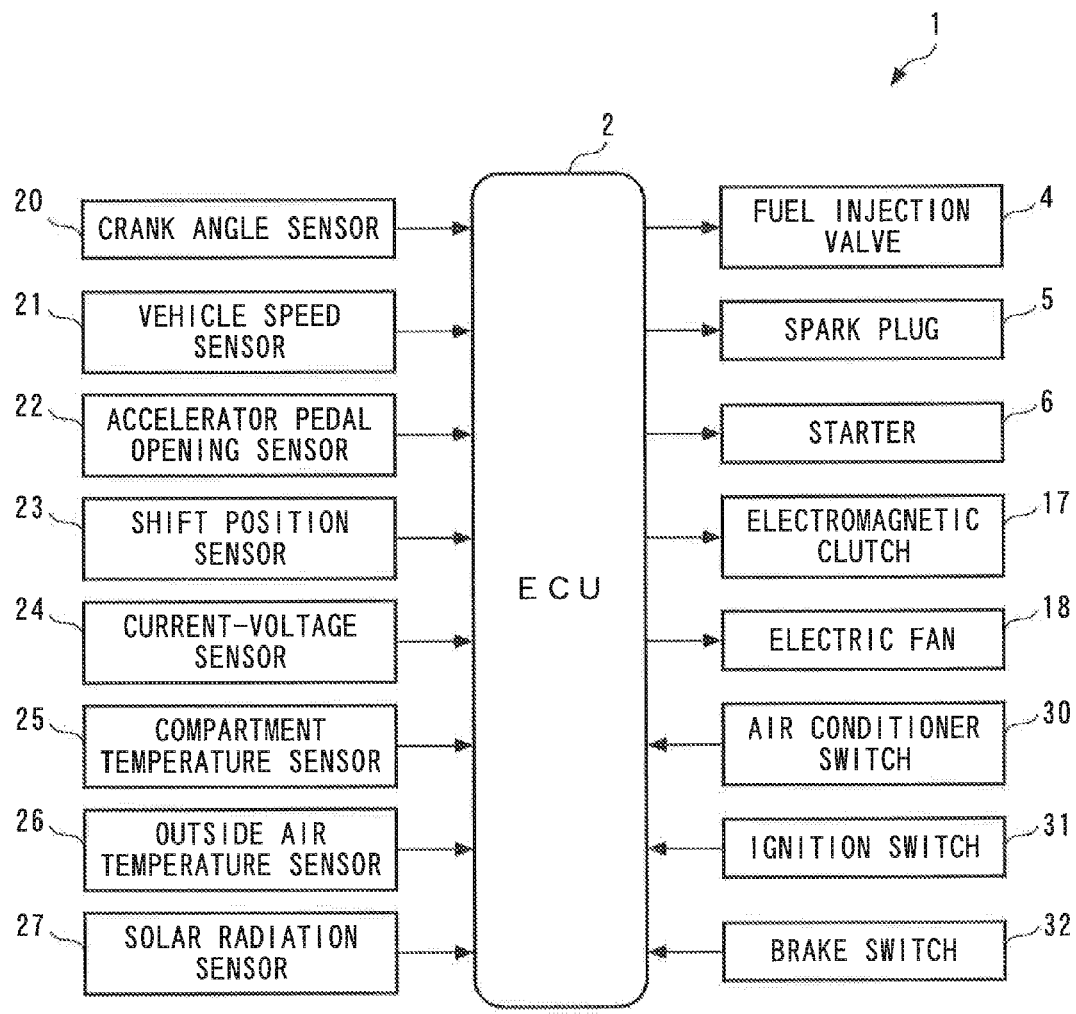
FIG. 2 is an electrical block diagram of the control system.

The internal combustion engine (hereinafter referred to as the "engine") 3 is a multi-cylinder engine powered by gasoline and installed on a vehicle, not shown, as a motive power source, and includes fuel injection valves 4 (only one of which is shown in FIG. 2) and spark plugs 5 (only one of which is shown in FIG. 2) provided for respective cylinders, a starter 6, and so forth.

Each fuel injection valve 4 is mounted through the cylinder head not shown) such that fuel is directly injected into a combustion chamber. The fuel injection valve 4 is electrically connected to the ECU 2, and a valve-opening time period and a valve-opening timing thereof are controlled by the ECU 2. That is, fuel injection control is executed.

Further, each spark plug 5 as well is electrically connected to the ECU 2, and a state of spark discharge is controlled by the ECU 2 such that a mixture in the combustion chamber is burned in timing corresponding to ignition timing. That is, ignition timing control is executed. Furthermore, the starter 6 as well is electrically connected to the ECU 2, and is controlled by the ECU 2 at the start of the engine 3 so as to drive a crankshaft 3a for rotation.

On the other hand, the air conditioner 10 is mounted on the vehicle. The air conditioner 10 is for cooling, dehumidifying, and heating a vehicle compartment R, and is provided with a refrigeration circuit for performing a cooling or dehumidifying operation. This refrigeration circuit is formed by serially connecting a compressor 11, a condenser 12, a receiver 13, an expansion valve 14, and an evaporator 15 by refrigerant piping 16, such that they form a closed circuit.

The compressor 11 is connected to the crankshaft 3a of the engine 3 via an electromagnetic clutch 17, a pulley 51, a belt 52, and a pulley 53. In a state having the electromagnetic clutch 17 connected thereto, the compressor 11 is driven by the crankshaft 3a, whereby refrigerant is compressed and sent to the condenser 12 as high-temperature high-pressure refrigerant via the refrigerant piping 16. The electromagnetic clutch 17 is electrically connected to the ECU 2, and the engaged/disengaged state thereof is controlled by the ECU 2.

The high-temperature high-pressure refrigerant sent from the compressor 11 is cooled and liquefied. by the condenser 12, and then is sent to the receiver 13 via the refrigerant piping 16, for being temporarily stored therein. Next, the refrigerant flows out from the receiver 13, and after having moisture removed therefrom by a dryer (not shown), is sent to the expansion valve 14. Then, the refrigerant is expanded by the expansion valve 14 in an atomized state and is sent to the evaporator 15 via the refrigerant piping 16. The evaporator 15 is provided within an air conditioner casing 61 communicating with the vehicle compartment R. The temperature of the refrigerant in the evaporator 15 is raised by heat exchange with air within the air conditioner casing 61, and the refrigerant is vaporized. The vaporized refrigerant is returned to the compressor 11 via the refrigerant piping 16.

A heater core 71 is disposed in the air conditioner casing 61 at a location downstream of the evaporator 15. The heater core 71 forms a cooling circuit of the engine 3 together with a water pump 72 and a circulation path 73. During operation of the engine 3, the heater core 71 is supplied with high-temperature engine coolant having cooled the engine 3, via the circulation path 73 by the water pump 72, whereby the temperature of the heater core 71 is raised. The water pump 72 is connected, to the crankshaft 3a via a pulley 54, a belt 55, and a pulley 56, and is always driven by the crankshaft 3a during operation of the engine 3.

Further, an air mix door 74 is disposed within the air conditioner casing 61 at a location immediately upstream of the heater core 71. The air mix door 74 is pivotally movable. The degree of opening of the air mix door 74 is changed by an actuator (not shown), whereby a ratio between the amount of air cooled by the evaporator 15 and the amount of air heated by the heater core 71 is changed to adjust the temperature of air blown out into the vehicle compartment R.

On the other hand, a pivotally-movable intake door 62 is disposed at the inlet of the air conditioner casino 61. This intake door 62 is for switching between inside air circulation for circulating air within the vehicle compartment R, within the same, and outside air introduction for introducing outside air into the vehicle compartment R. The switching is performed using a switching lever (not shown) provided for the driver's seat.

Further, an electric fan 18 is disposed at the inlet of the air conditioner casing 61. This electric fan 13 is electrically connected to the ECU 2, and the operating state thereof is controlled by the ECU 2 according to the operated. state of an air conditioner switch 30, described hereinafter. During operation of the electric fan 18, the air within the air conditioner casing 61 is blown out from blowout ports 63a to 63c into the vehicle compartment R. At this time, during the cooling or dehumidifying operation of the air conditioner 10, air is blown out in a state cooled and dried by heat exchange with the evaporator 15, to thereby cool and dehumidify the vehicle compartment R. Further, during heating operation of the air conditioner 10, air is blown out in a state heated by the heater core 71, to thereby heat the vehicle compartment R.

Furthermore, the blowout ports 63a to 63c are provided with pivotally-movable doors 64a to 64c for opening and closing the blowout ports 63a to 63c, respectively. The door 64a to 64c are opened and closed using a blowout switch (not shown) provided for the driver's seat.

On the other hand, as shown in FIG. 2, connected to the ECU 2 are a crank angle sensor 20, a vehicle speed sensor 21, an accelerator pedal opening sensor 22, a shift position sensor 23, a current-voltage sensor 24, a compartment temperature sensor 25, an outside air temperature sensor 26, a solar radiation sensor 27, the air conditioner switch 30, an ignition switch 31, and a brake switch 32.

The crank angle sensor 20 delivers a CRK signal, which is a pulse signal, to the ECU 2 along with rotation of the crankshaft 3a, whenever the crankshaft 3a rotates through a predetermined angle (e.g. 2°). The ECU 2 calculates a rotational speed NE of the engine 3 (hereafter referred to as the "engine speed NE") based on the CRK signal. The vehicle speed sensor 21 is attached to an axle, not shown, of the vehicle, and detects a traveling speed VP of the vehicle (hereafter referred to as the "vehicle speed VP"), to deliver a signal indicative of the detected vehicle speed VP to the ECU 2.

The accelerator pedal opening sensor 22 detects a stepped-on amount AP of an accelerator pedal, not shown, (hereinafter referred to as the "accelerator pedal opening AP"), and delivers a signal indicative of the detected accelerator pedal opening AP to the ECU 2. The shift position sensor 23 detects one of shift positions (L, 2, D, N, R, and P) of an automatic transmission, not shown, and delivers a signal indicative of the detected shift position to the ECU 2.

The current-voltage sensor 24 detects values of current and voltage input to and output from a battery, not shown, and delivers signals indicative of the detected current and voltage values to the ECU 2. The ECU 2 calculates the amount of electric power accumulated in the battery, i.e. a remaining charge SOC of the battery, and the like, based on the detection signals from the current-voltage sensor 24. Note that in the present embodiment, the current-voltage sensor 24 corresponds to power parameter-detecting means.

The compartment temperature sensor 25 detects a temperature TR in the vehicle compartment R (hereafter referred to as the "compartment temperature TR"), and delivers a signal indicative of the detected compartment temperature TR to the ECU 2. Note that in the present embodiment, the compartment temperature sensor 25 corresponds to air conditioner suction temperature-detecting means and operating environment parameter-detecting means, and the compartment temperature TR corresponds to an operating environment parameter.

The outside air temperature sensor 26 detects a temperature TAM of air outside the vehicle (hereafter referred to as the "outside air temperature TAM"), and delivers a signal indicative of the detected outside air temperature TAM to the ECU 2. Note that in the present embodiment, the outside air temperature sensor 26 corresponds to the air conditioner suction temperature-detecting means and the operating environment parameter-detecting means, and the outside air temperature TAM corresponds to the operating environment parameter.

The solar radiation sensor 27 detects an amount GSOL of solar radiation (hereafter referred to as the "solar radiation amount GSOL") received by window glass, and delivers a signal indicative of the detected solar radiation amount GSOL to the ECU 2. Note that in the present embodiment, the solar radiation sensor 27 corresponds to the air conditioner suction temperature-detecting means and the operating environment parameter-detecting means, and the solar radiation amount GSOL corresponds to the operating environment parameter.

The air conditioner switch 30 detects an operated state of the air conditioner 10 by the user, such as a set temperature TSET of the air conditioner 10, and delivers a signal indicative of the detected operated state of the air conditioner 10 to the ECU 2. Note that in the present embodiment, the air conditioner switch 30 corresponds to the operating environment parameter-detecting means, and the set temperature TSET corresponds to the operating environment parameter.

The ignition switch 31 is switched to one of an off position, an on position and a start position by operation of an ignition key (not shown), and delivers a signal indicative of the one of the above positions to the ECU 2. The brake switch 32 is provided in a brake pedal mechanism, not shown. When a brake pedal, not shown, is stepped on by an amount not smaller than a predetermined amount, the brake switch 32 delivers an on signal to the ECU 2, and otherwise it delivers an off signal to the ECU 2.

The ECU 2 is implemented by a microcomputer comprising a CPU, a RAM, a ROM and an I/O interface (none of which are specifically shown). The ECU 2 determines the operating states of the engine 3 and the air conditioner 10 based on the detection signals from the above-described sensors 20 to 27 and the signals from switches 30 to 32, and executes the processes for controlling the operations of the engine 3 and the air conditioner 10.

Note that in the present embodiment, the ECU 2 corresponds to lower limit blowout temperature-setting means, estimated blowout temperature-calculating means, control means, the air conditioner suction temperature-detecting means, the power parameter-detecting means, stop-time blowout temperature-calculating means, temperature drop amount-calculating means, subtraction means, and the operating environment parameter-detecting means.

Next, an idle stop control process executed by the ECU 2 will be described with reference to FIG. 3. As will be described hereinafter, the idle stop control process is for restarting the engine 3 after stopping the same during stoppage of the vehicle, and is executed at a predetermined control period ΔT (e.g. 10 msec in the present embodiment).

Figure 3:
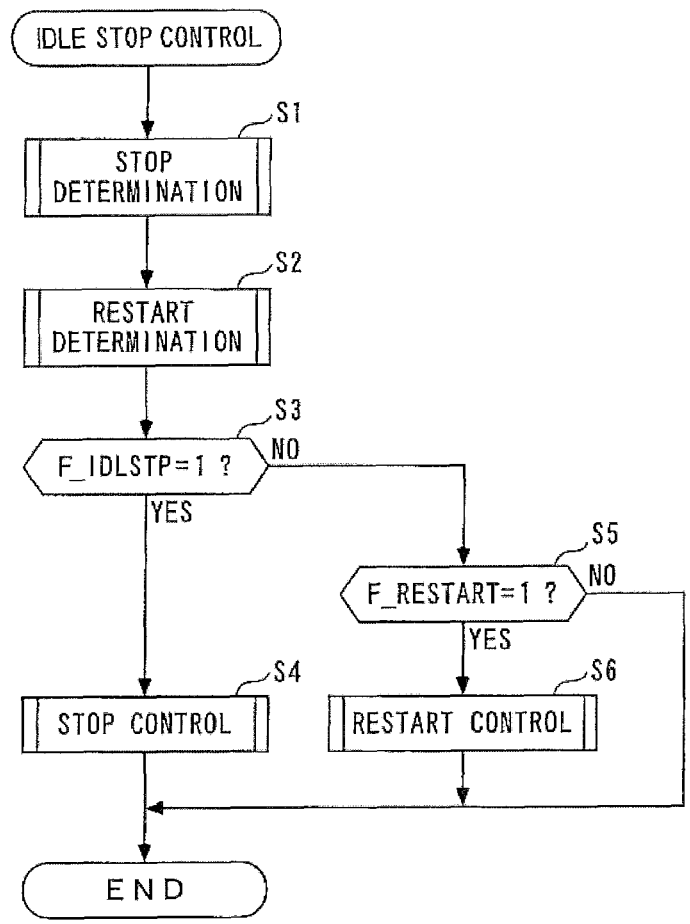
FIG. 3 is a flowchart of an idle stop control process.

As shown in FIG. 3, first, in a step 1 (shown as S1 in abbreviated form in FIG. 3; the following steps are also shown in abbreviated form), a stop determination process is carried out. This stop determination process is for determining whether or not conditions for executing a stop control process for stopping the engine 3 during stoppage of the vehicle are satisfied. Specifically, the stop determination process is executed as shown in FIG. 4.

Figure 4:
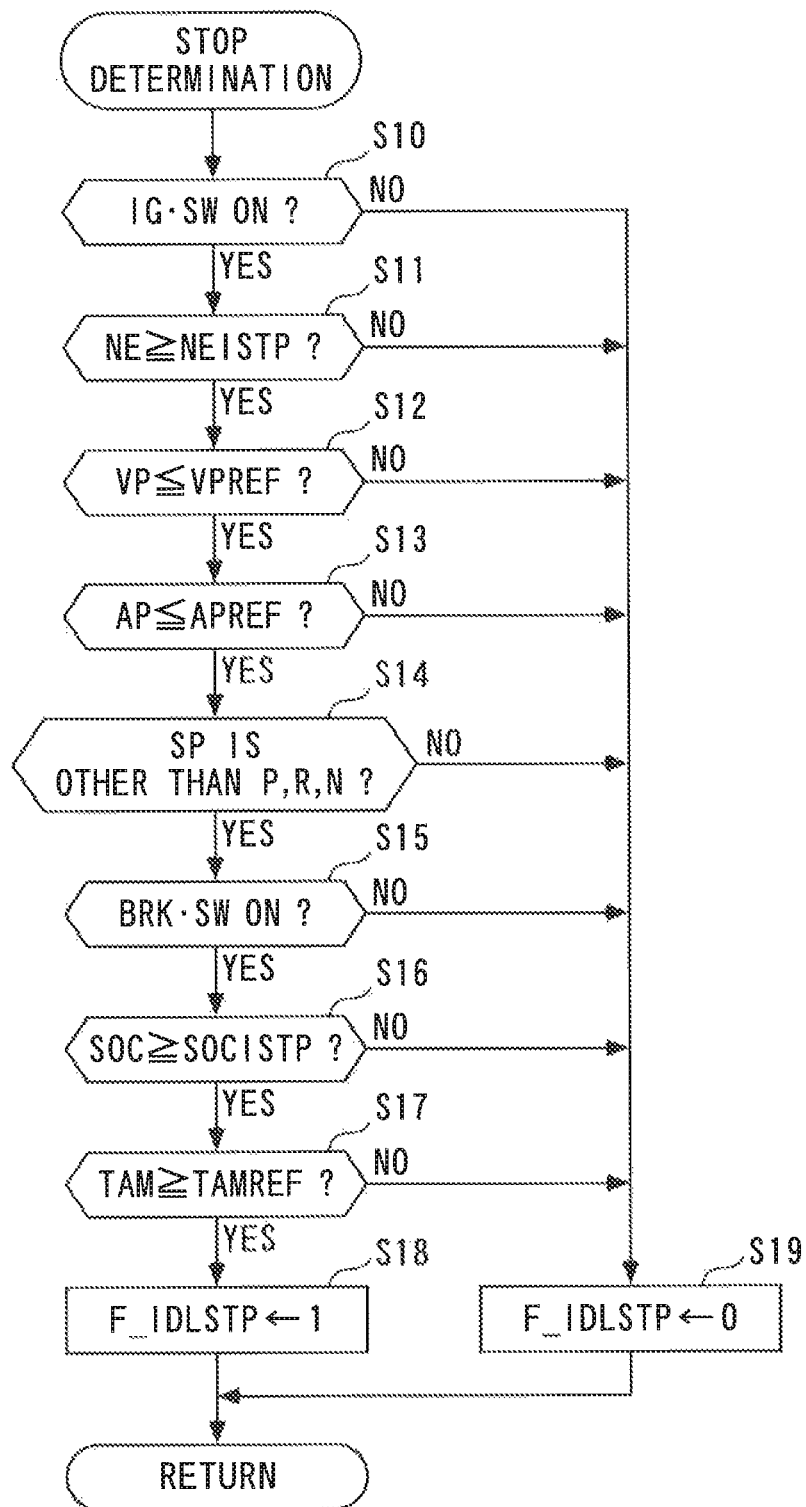
FIG. 4 is a flowchart, of a stop determination process.

That is, as shown in FIG. 4, in steps 10 to 17, it is determined whether or not the following conditions (c1) to (c8) are satisfied, respectively.

(c1) The ignition switch 31 is at the on position.

(c2) The engine speed NE is not lower than a predetermined value NEISTP.

(c3) The vehicle speed VP is not higher than a predetermined value VPREF.

(c4) The accelerator pedal opening AP is not larger than a predetermined value APREF.

(c5) The shift position (represented by SP in FIG. 4) is other than F, R, and N.

(c6) The brake switch 32 delivers the on signal.

(c7) The battery remaining charge SOC is not lower than a predetermined value SOCISTP.

(c8) The outside air temperature TAM is not lower than a predetermined temperature TAMREF.

If all the answers to the respective questions of the steps 10 to 17 are affirmative (YES), i.e. if all the conditions (c1) to (c8) are satisfied, it is determined that the conditions for executing the stop control process are satisfied, and the process proceeds to a step 18, wherein to indicate the fact, a stop control flag F_IDLSTP is set to 1, followed by terminating the present process.

On the other hand, if any of the answers to the respective questions of the steps 10 to 17 is negative (NO), i.e. if any of the conditions (c1) to (c8) is not satisfied, it is determined that the conditions for executing the stop control process are not satisfied, and the process proceeds to a step 19, wherein to indicate the fact, the stop control flag F_IDLSTP is set to 0, followed by terminating the present process.

Referring again to FIG. 3, in the step 1, the stop determination process is executed, as described above, and then the process proceeds to a step 2 to execute a restart determination process. This restart determination process is for determining whether or not conditions for executing a restart control process for restarting the engine 3 in a stopped state are satisfied. Specifically, the restart determination process is executed as shown in FIG. 5.

Figure 5:
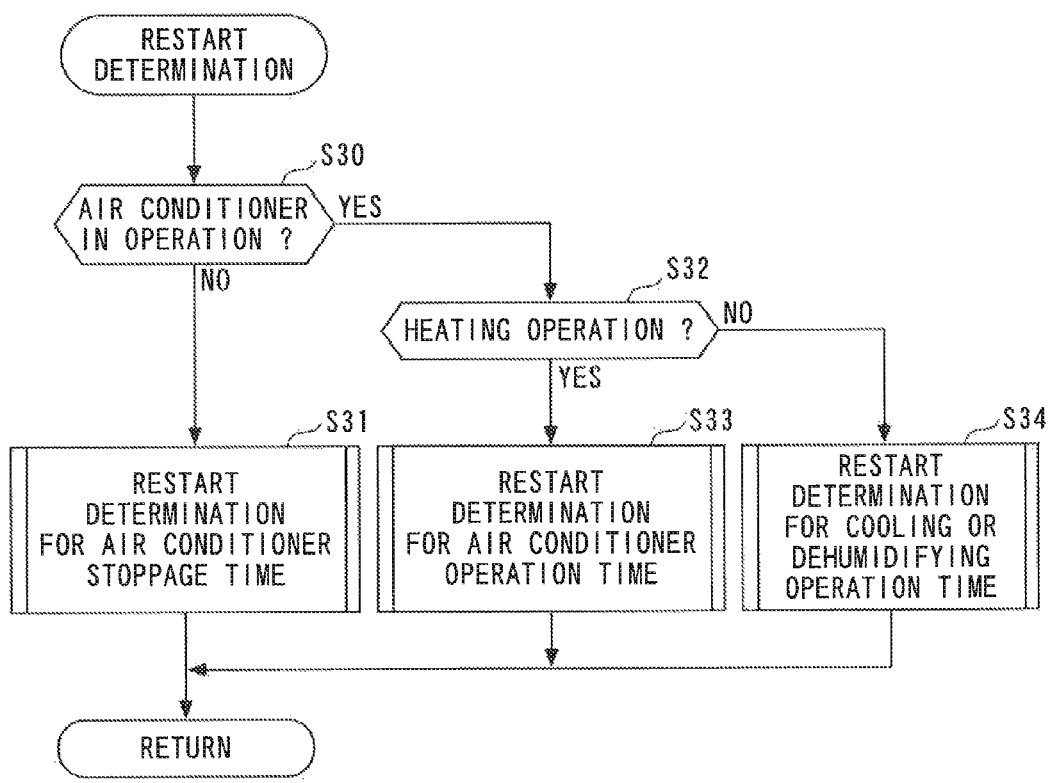
FIG. 5 is a flowchart of a restart determination process.

As shown in FIG. 5, first, in a step 30, it is determined whether or not, the air conditioner 10 is in operation. If the answer to this question is negative (NO), i.e. if the air conditioner 10 has been stopped, the process proceeds to a step 31, wherein a restart determination process for air conditioner stoppage time is executed, followed by terminating the present process. Although detailed description of the restart determination process for air conditioner stoppage time is omitted, in this determination process, when the conditions for executing the restart control process are satisfied during stoppage of the air conditioner 10, a restart control flag F_RESTART is set to 1, and is otherwise set to 0.

On the other band, if the answer to the question. of the step 30 is affirmative (YES), i.e. if the air conditioner 10 is in operation, the process proceeds to a step 32, wherein it is determined whether or not the air conditioner 10 is performing a heating operation. If the answer to this question is affirmative (YES), i.e. if the air conditioner 10 is performing a heating operation, the process proceeds to a step 33, wherein a restart determination process for air conditioner operation time is executed. This determination process is executed specifically as shown in FIG. 6.

Figure 6:
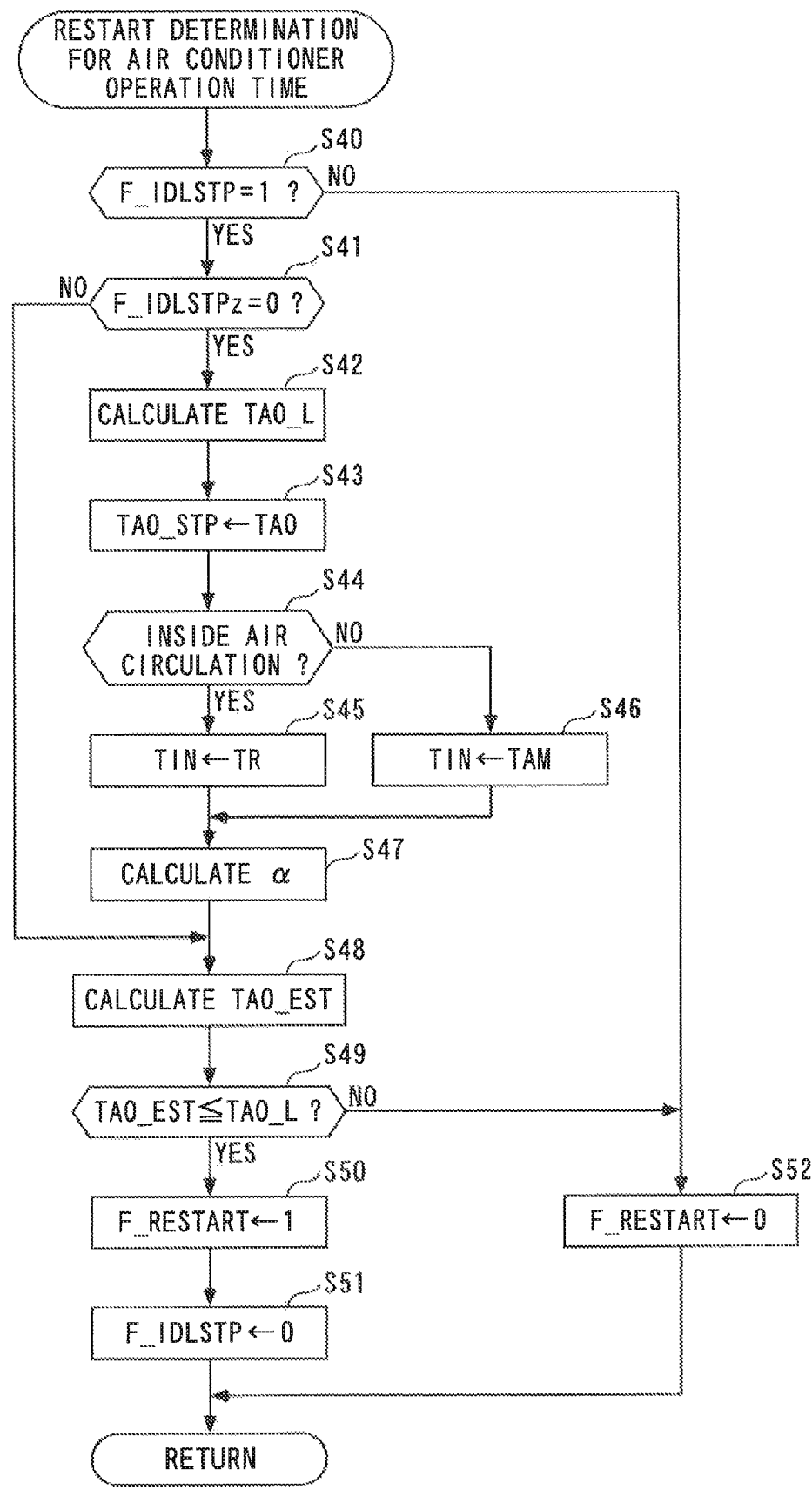
FIG. 6 is a flowchart of a restart determination process executed during a heating operation.

As shown in FIG. 6, first, in a step 40, it is determined whether or not the stop control flag F_IDLSTP is equal to 1. If the answer to this question is negative (NO), it is determined that it is not necessary to restart the engine 3, and the conditions for executing the restart control process are not satisfied, the process proceeds to a step 52, wherein to indicate the fact, the restart control flag F_RESTART is set to 0, followed by terminating the present process.

On the other hand, if the answer to the question of the step 40 is affirmative (YES), the process proceeds to a step 41, wherein an immediately preceding value F_IDLSTPz of the stop control flag is equal to 0. If the answer to this question is negative (NO), i.e. if the conditions for executing the stop control process were satisfied in the immediately preceding control timing, the process proceeds to a step 48, referred to hereinafter.

On the other hand, if the answer to the question of the step 41 is affirmative (YES), i.e. if the conditions for executing the stop control process have come to be satisfied in the current control timing, the process proceeds to a step 42, wherein a lower limit blowout temperature TAO_L, is calculated by searching a map shown in FIG. 7 according to a target blowout temperature TAO. This target blowout temperature TAO is calculated in an air conditioner control process, described hereinafter.

Referring to FIG. 7, TAO1 and TAO2 represent predetermined values of the target blowout temperature TAO, and are set in advance such that TAO1<TAO2 holds. Further, TAO_L1 and TAO_L2 represent predetermined values of the lower limit blowout temperature TAO_L, and are set in advance such that TAO_L1<TAO_L2 holds. In this map, the lower limit blowout temperature TAO_L is set to the fixed value TAO_L1 in a range of TAO<TAO1, and is set to the fixed value TAO_L2 in a range of TAO2<TAO. Further, in a range of TAO1≤TAO≤TAO2, the lower limit blowout temperature TAO_L, is set to a higher value as the target blowout temperature TAO is higher. This is because an actual blowout temperature is proportional to the target blowout, temperature TAO in the range of TAO1≤TAO≤TAO2. Further, in the above map, the lower limit blowout temperature TAO_L is set to a lowest temperature that does not discomfort an occupant in the vehicle compartment during the heating operation of the air conditioner 10.

In a step 43 following the step 42, a stop-time blowout temperature TAO_STP is set to the target blowout temperature TAO. Then, the process proceeds to a step 44, wherein it is determined whether or not the inside air circulation is being performed. If the answer to this question is affirmative (YES), the process proceeds to a step 45, wherein an air conditioner suction temperature TIN is set to the compartment temperature TR. On the other hand, if the answer to the question of the step 44 is negative (NO), i.e. if the outside air introduction is being performed, the process proceeds to a step 46, wherein the air conditioner suction temperature TIN is set to the outside, air temperature TAM.

In a step 47 following the step 45 or 46, a temperature drop amount α is calculated by searching a map shown in FIG. 8 according to the air conditioner suction temperature TIN and a fan voltage VF. The temperature drop amount α represents a value of drop amount of the compartment temperature TR per unit time. Further, the fan voltage VP represents a value of a voltage supplied from the battery to the electric fan 18, and is detected by the above-mentioned current-voltage sensor 24.

Furthermore, in FIG. 8, VF1 to VFi (i represents an integer) represent predetermined values of the fan voltage VF, and are set to larger values as the value of i is larger. Further, TIN1 to TINj (j represents an integer) represent predetermined values of the air conditioner suction temperature TIN, and are set to larger values as the value of j is larger. In this map, the temperature drop amount α is set to larger values as the fan voltage VF is higher or the air conditioner suction temperature TIN is lower. This is because the actual blowout temperature is easier to be lowered as the fan voltage VP is higher or the air conditioner suction temperature TIN is lower.

In a step 48 following the step 41 or 47, an estimated blowout temperature TAO_EST is calculated by the following equation (1):

$$TAO\_EST = TAO\_STP - \alpha \cdot TOFF \quad (1)$$

In this equation (1), TOFF represents a time period elapsed after satisfaction of the conditions for executing the stop control process and stoppage of the engine 3, and therefore the product α·TOFF of the elapsed time period TOFF and the temperature drop amount α corresponds to the drop amount of the blowout temperature from the engine stop timing to the present time.

Next, the process proceeds to a step 49, wherein it is determined whether or not the estimated blowout. temperature TAO_EST is not higher than the lower limit blowout temperature TAO_L. If the answer to this question is negative (NO), i.e. if TAO_EST>TAO_L holds, it is determined that the conditions for executing the restart control process are not satisfied, and the process proceeds to the above-described step 52, wherein the restart control flag F_RESTART is set to 0, followed by terminating the present process.

On the other hand, if the answer to the question of the step 49 is affirmative (YES), i.e. if TAO_EST≤TAO_L holds, it is determined that the conditions for executing the restart control process are satisfied, and the process proceeds to a step 50, wherein to indicate the fact, the restart control flag F_RESTART is set to 1. Then, the process proceeds to a step 51, wherein the stop control flag F_IDLSTP is set to 0, followed by terminating the present process.

Referring again to FIG. 5, in the step 33, the restart determination process during the heating operation of the air conditioner 10 is executed, as described above, followed by terminating the FIG. 5 restart determination process.

On the other hand, if the answer to the question of the above-described step 32 is negative (NO), i.e. if the air conditioner 10 is performing a cooling operation or a dehumidifying operation, the process proceeds to a step 34, wherein a restart determination process for cooling or dehumidifying operation time is executed. Although detailed description of the restart determination process for cooling or dehumidifying operation time is omitted, in this determination process, when the conditions for executing the restart control process are satisfied during the cooling or dehumidifying operation of the air conditioner 10, the restart control flag F_RESTART is set to 1, and is otherwise set to 0. After execution of the step 34, as described above, the FIG. 5 restart determination process is terminated.

Referring again to FIG. 3, in the step 2, the restart determination process is executed, as described above, and then the process proceeds to a step 3, wherein it is determined whether or not the stop control flag F_IDLSTP is equal to 1. If the answer to this question is affirmative (YES), the process proceeds to a step 4 to execute the stop control process of the engine 3. Specifically, fuel injection of each fuel injection valve 4 is stopped, and at the same time the ignition operation of each spark plug 5 is stopped, whereby the engine 3 is stopped. After thus executing the step 4, the present process is terminated.

On the other hand, if the answer to the question of the step 3 is negative (NO), i.e. if F_IDLSTP=0 holds, the process proceeds to a step 5, wherein it is determined whether or not the restart control flag F_RESTART is equal to 1. If the answer to this question is negative (NO), the present process is immediately terminated.

On the other hand, if the answer to the question of the step 5 is affirmative (YES), the process proceeds to a step 6 to execute the restart control process of the engine 3. Specifically, the crankshaft 3a is driven, for rotation by the starter 6, and fuel injection of each fuel injection valve 4 and the ignition operation of each spark plug 5 are executed, to thereby restart the engine 3. After thus executing the step 6, the present process is terminated.

Next, the air conditioner control process executed by the ECU 2 will be described with reference to FIG. 9. As described hereinafter, this air conditioner control process is for controlling the operation and stoppage of the air conditioner 10, and is executed at the above-mentioned predetermined. control period ΔT.

Figure 9:
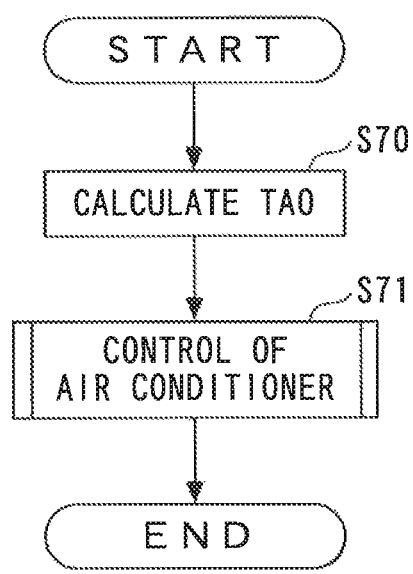
FIG. 9 is a flowchart of an air conditioner control process.

As shown in FIG. 9, first, in a step 70, the target blowout temperature TAO is calculated. This target blowout temperature TAO is calculated by searching a map, not shown, according to the compartment temperature TR, the outside air temperature TAM, the solar radiation amount GSOL, and the set temperature TSET output from the air conditioner switch 30.

Then, the process proceeds to a step 71, wherein the operation or stoppage of the air conditioner 10 is controlled according to the target blowout temperature TAO, the operating condition of the air conditioner switch 30, etc. followed by terminating the present process.

As described heretofore, according to the control system 1 of the present embodiment, the lower limit blowout temperature TAO_L is calculated based on the target blowout temperature TAO when F_IDLSTP=1 holds, and the estimated blowout temperature TAO_EST is calculated by subtracting the temperature drop amount α·TOFF from the stop-time blowout temperature TAO_STP. Further, when the estimated blowout temperature TAO_EST has become not higher than the lower limit blowout temperature TAO_L, the engine 3 is restarted. In the case of the engine 3 according to the present. embodiment, the water pump 72 is configured to be driven by the motive power of the engine 3, and hence when the engine 3 is temporarily stopped by the idle stop control during stoppage of the vehicle, the water pump 72 as well is stopped. As a consequence, the engine coolant ceases to circulate within the cooling circuit to stop supply of heat from the cylinder block of the engine 3 to the heater core 71 of the air conditioner 10, which results in the lowered blowout temperature.

On the other hand, according to the control system 1 of the present embodiment, when the estimated blowout temperature TAO_EST has become not higher than the lower limit blowout temperature TAO_L, the engine 3 is restarted, and the lower limit blowout temperature TAO_L is set to the lowest temperature that does not discomfort an occupant in the vehicle compartment during the heating operation of the air conditioner 10. Therefore, even when the blowout temperature is lowered along with stoppage of the engine 3 during the heating operation, it is possible to restart the engine 3 in timing by which an engine stoppage time period can be ensured as long as possible while preventing the compartment temperature from being lowered to an unpleasant temperature. This makes it possible to ensure marketability and fuel economy performance in a well-balanced manner.

Further, the estimated blowout temperature TAO_EST is calculated by subtracting the temperature drop amount α·TOFF from the stop-time blowout temperature TAO_STP. The temperature drop amount α·TOFF is the product of the temperature drop amount α and the elapsed time period TOFF, and the temperature drop amount α is calculated based on the fan voltage VS and the air conditioner suction temperature TIN detected when F_IDLSTP=1 holds, i.e. when the conditions for executing the stop control process are satisfied. In this case, both of the fan voltage VF and the air conditioner suction temperature TIN have a very high correlation with the drop of the temperature of air blown out from the air conditioner 10 after timing in which the engine 3 is temporarily stopped, so that by using such two values, it is possible to calculate the temperature drop amount after the timing in which the engine 3 is temporarily stopped, with high calculation accuracy, which makes it possible to enhance the calculation accuracy of the estimated blowout temperature TAO_EST. As a consequence, it is possible to more properly determine restart timing from the stopped state of the engine 3, thereby making it possible to ensure marketability and fuel economy performance in a well-balanced manner.

Further, the lower limit blowout temperature TAO_L is calculated based on the target blowout temperature TAO when F_IDLSTP=1 holds, and the target blowout temperature TAO is set according to the compartment temperature TR, the outside air temperature TAM, the solar radiation amount GSOL, and the set temperature TSET, and hence, the lower limit blowout temperature TAO_L is calculated based on values, such as the compartment temperature TR, the outside air temperature TAM, the solar radiation amount GSOL, and the set temperature TSET, which indicate the operating environment of the air conditioner 10, in timing in which the conditions for executing the stop control process are satisfied. This makes it possible to properly set the lower limit blowout temperature TAO_L while causing the operating environment of the air conditioner 10 in timing for stopping the engine 3 to be reflected thereon. As a consequence, it is possible to more properly determine the restart timing of the engine 3 from the stopped state thereof, thereby making it possible to ensure marketability and fuel economy performance in a better-balanced manner.

Although in the above-described embodiment, the water pump 72 is used as a heat supply device, by way of example, the heat supply device of the present invention is not limited to this, but any suitable heat supply device may be employed insofar as it supplies heat to the air conditioner of the vehicle.

Further, although in the above-described embodiment, the fan voltage VF is used as the power parameter, by way of example, the power parameter of the present invention is not limited to this, any suitable power parameter may be employed insofar as it represents electric power supplied to the electric fan. For example, electric current supplied to the electric fan may be used as the power parameter.

Furthermore, although in the above-described embodiment, the current-voltage sensor 24 is used as the power parameter-detecting means, by way of example, the power parameter-detecting means of the present invention is not limited to this, but any suitable power parameter-detecting means may be employed insofar as it detect a power parameter indicative of electric power supplied to the electric fan. For example, a sensor for detecting the value of electric current supplied to the electric fan may be used as the power parameter-detecting means.

On the other hand, although in the above-described embodiment, the compartment temperature TR, the outside air temperature TAM, the solar radiation amount GSOL, and the set temperature TSET are used as the operating environment parameters, by way of example, the operating environment parameters of the present invention are not limited to these, but any suitable operating environment parameters may be employed insofar as they represent the operating environment of the air conditioner.

It is further understood by those skilled in the art that the foregoing are preferred embodiments of the invention, and that various changes and modifications may be made without departing from the spirit and scope thereof.

What is claimed is:

1. A control system for an internal combustion engine that is installed on a vehicle as a motive power source and is connected, as a motive power source, to a heat supply device that supplies heat to an air conditioner of the vehicle, the control system executing idle stop control for temporarily stopping the engine during stoppage of the vehicle and restarting the engine from the temporarily stopped state, comprising:
   lower limit blowout temperature-setting means for setting a lower limit value of a blowout temperature that is a temperature of air blown out from the air conditioner into a compartment of the vehicle, as a lower limit blowout temperature;
   estimated blowout temperature-calculating means for calculating an estimated value of the blowout temperature as an estimated blowout temperature; and
   control means for causing the engine to be restarted when the estimated blowout temperature calculated when the engine is in the temporarily stopped state has become not higher than the lower limit blowout temperature,
   wherein the air conditioner includes an electric fan,
   the control system further comprising:
      air conditioner suction temperature-detecting means for detecting a temperature of air sucked into the air conditioner as an air conditioner suction temperature; and
      power parameter-detecting means for detecting a power parameter indicative of electric power supplied to said electric fan,
   wherein said estimated blowout temperature-calculating means comprises:
      stop-time blowout temperature-calculating means for calculating the blowout temperature in timing in which the engine is temporarily stopped, as a stop-time blowout temperature;
      temperature drop amount-calculating means for calculating a temperature drop amount of the air blown out from the air conditioner after the timing in which the engine is temporarily stopped, using the air conditioner suction temperature detected when the engine is in the temporarily stopped state, and the power parameter detected when the engine is in the temporarily stopped state; and
      subtraction means for calculating the estimated blowout temperature by subtracting the calculated temperature drop amount from the calculated stop-time blowout temperature.

2. The control system as claimed in claim 1, further comprising operating environment parameter-detecting means for detecting an operating environment parameter indicative of an operating environment of the air conditioner, and
   wherein said lower limit blowout temperature-setting means sets the lower limit blowout temperature based on the operating environment parameter detected in the timing in which the engine is temporarily stopped.

3. A control system for an internal combustion engine that is installed on a vehicle as a motive power source and is connected, as a motive power source, to a heat supply device that supplies heat to an air conditioner of the vehicle, the control system executing idle stop control for temporarily stopping the engine during stoppage of the vehicle and restarting the engine from the temporarily stopped state, comprising:
   an electronic control unit programmed to:
      set a lower limit value of a blowout temperature that is a temperature of air blown out from the air conditioner into a compartment of the vehicle, as a lower limit blowout temperature,
      calculate an estimated value of the blowout temperature as an estimated blowout temperature, and
      cause the engine to be restarted when the estimated blowout temperature calculated when the engine is in the temporarily stopped state has become not higher than the lower limit blowout temperature,
   wherein the air conditioner includes an electric fan,
   the control system further comprising:
      a compartment temperature sensor for detecting a temperature of air sucked into the air conditioner as an air conditioner suction temperature; and
      a current-voltage sensor for detecting a power parameter indicative of electric power supplied to said electric fan,
   wherein said control unit is further programmed to:
      calculate the blowout temperature in timing in which the engine is temporarily stopped, as a stop-time blowout temperature;
      calculate a temperature drop amount of the air blown out from the air conditioner after the timing in which the engine is temporarily stopped, using the air conditioner suction temperature detected when the engine is in the temporarily stopped state, and the power parameter detected when the engine is in the temporarily stopped state; and
      calculate the estimated blowout temperature by subtracting the calculated temperature drop amount from the calculated stop-time blowout temperature.

4. The control system according to claim 3, wherein the control unit is further programmed to detect an operating environment parameter indicative of an operating environment of the air conditioner, and
   set the lower limit blowout temperature based on the operating environment parameter detected in the timing in which the engine is temporarily stopped.

* * * * *